US009467053B2

(12) United States Patent
Fabbro (10) Patent No.: US 9,467,053 B2
(45) Date of Patent: Oct. 11, 2016

(54) CONTROLLING A MULTI-MODE SWITCHING CONVERTER (75) Inventor: Simone Fabbro, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1212 days.

(21) Appl. No.: 12/500,480

(22) Filed: Jul. 9, 2009

(65) Prior Publication Data

US 2011/0006743 A1    Jan. 13, 2011

(51) Int. Cl.
G05F 1/56 (2006.01)
H02M 3/158 (2006.01)
G05F 1/563 (2006.01)
H02M 1/00 (2006.01)

(52) U.S. Cl.
CPC ... H02M 3/1582 (2013.01); *H02M 2001/0048* (2013.01); *Y02B 70/1491* (2013.01)

(58) Field of Classification Search
USPC ......... 323/259, 269–271, 282–284, 344, 351
See application file for complete search history.

(56) References Cited

U.S. PATENT DOCUMENTS

| | | |
|---|---|---|
| 6,166,527 A | 12/2000 | Dwelley et al. |
| 6,275,016 B1 | 8/2001 | Ivanov |
| 7,298,119 B1 | 11/2007 | Amram Summit et al. |
| 2007/0075687 A1 | 4/2007 | Ishii et al. |
| 2008/0001587 A1* | 1/2008 | Cremoux ...................... 323/282 |
| 2009/0003021 A1 | 1/2009 | Tsukamoto |
| 2009/0045786 A1* | 2/2009 | Krellner et al. ............. 323/259 |
| 2009/0146623 A1 | 6/2009 | De Cremoux et al. |
| 2012/0032658 A1* | 2/2012 | Casey et al. .................. 323/271 |

FOREIGN PATENT DOCUMENTS

DE    39 14 069 A1    10/1990
WO    WO2005046035    5/2005

* cited by examiner

*Primary Examiner* — Adolf Berhane
*Assistant Examiner* — Nusrat Quddus
(74) *Attorney, Agent, or Firm* — Shumaker & Sieffert, P.A.

(57) ABSTRACT

Systems and methods for controlling a switching converter using a duty cycle associated with either a buck mode or a boost mode of the switching converter. More particularly, a controller determines when to change between buck mode and boost mode based on the duty cycle associated with one of the buck mode or the boost mode.

20 Claims, 7 Drawing Sheets

CONTROLLING A MULTI-MODE SWITCHING CONVERTER

BACKGROUND

Manufacturers of battery powered devices typically face a challenge of making their designs compatible with many battery disparate technologies that offer supply voltages ranges differing in their provided maximum, nominal, and minimum values. Moreover, whatever the chosen battery technology is, there is a desire for the battery to deliver its complete energy capability to the load and that the battery's energy capability be exploited with high efficiency, without leaving useful energy in the battery cells. This situation has led in time to batteries offering a wider and wider output voltage range, so that the battery's output voltage during the discharge phase can be higher and in the same range or even much lower than the minimum voltage that the load can accept. This desire goes together with increasing demands that the end-user applications be powered for longer durations. Hence, one aspect of end-user satisfaction is using the energy of the battery down to the last erg while avoiding energy loss thereby increasing energy conversion efficiency.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are techniques for controlling switching converters. In one described embodiment, a switching converter is controlled using the buck duty cycle (or the boost duty cycle or both) of the switching converter as an input to a controller for the switching converter.

This document discloses various methods, system, apparatus, techniques, etc. of controlling a switching convert by determining the duty cycle of either a buck branch or a boost branch (or both) of the switching converter. When the determined duty cycle reaches a threshold associated therewith control is changed from either buck mode or boost mode (depending on which mode the switching converter was operating in prior to reaching the threshold). In addition, this document discloses various methods, system, apparatus, techniques, etc. for maintaining or achieving certain transient response characteristics of switching converters controlled as disclosed further herein.

More particularly, this document discloses the general operation of battery powered devices of some embodiments with emphasis on the power supplies thereof. The document also discloses how the switching converters in the power supplies of these devices operate. The document also discloses timing diagrams associated with various embodiments of switching converters and how the switching converters deliver power to various devices. Additionally, the document discloses analog embodiments of controllers associated with the switching converters of some embodiments as well as methods of controlling such switching converters.

Figure 1A:
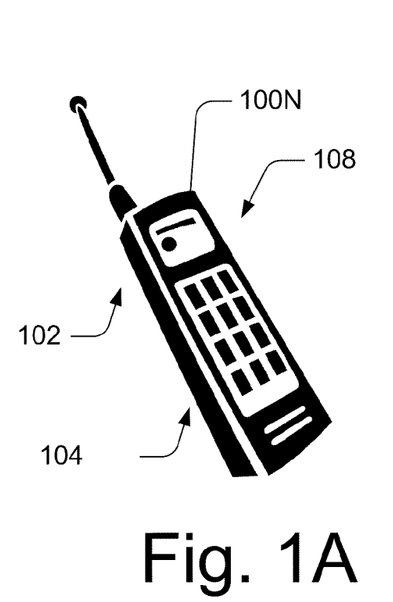
FIGS. 1A and B are perspective views of a battery powered device according to certain embodiments.
Figure 1B:
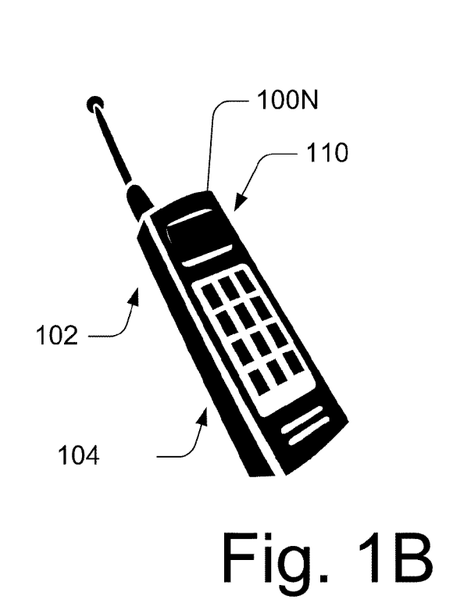

FIGS. 1A and 1B are perspective views of a battery powered device 100 of some embodiments. The device 100 could be any type of electrically powered device such as a device powered by line power, solar power, generators, etc. The illustrative device 100 includes various features such as user controls, output components, etc. and is capable of performing some function(s) desired by its user. For instance, the device 100 could be a cellular telephone with a display 102, user input buttons 104, a microphone, a speaker, etc. and may transmit and receive electromagnetic signals, thereby conveying conversations and other data.

Figure 1C:
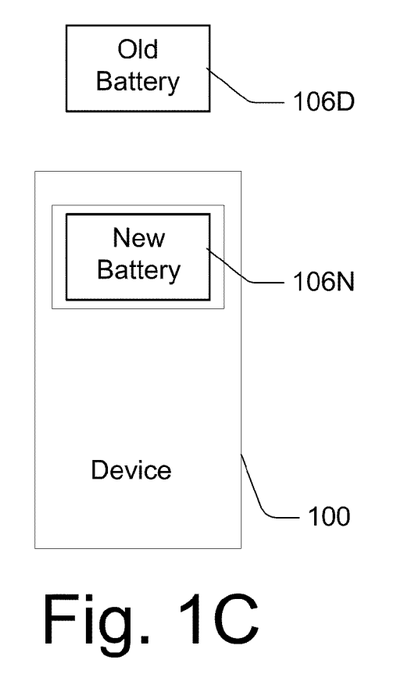
FIG. 1C is a schematic view of a battery powered device according to certain embodiments.

In the particular embodiment illustrated by FIG. 1C, the device 100 includes either a new (or in specification) battery 106N or a partially discharged (or old or degraded) battery 106D to power the device 100. Thus, when the user manipulates the device 100 via the user input buttons 104 (or other features), the device 100 will perform some function such as displaying an image 108 on the display 102. The display of the image 108 is merely illustrative and represents many other possible functions of the device 100. While the battery 106 is supplying power within the specifications to which the device was designed, the device typically performs its functions (such as displaying the image 108) in a consistent and reliable manner. However, should the battery 106 (or other power supply) deliver power outside of the specifications of the device 100, the device 100 may begin to malfunction or be unable to perform all of its functions consistently or reliably. This result occurs because the power supply (not shown in FIGS. 1A-C) of the device 100 is not designed to both accept out-of-specification power from the battery 106 and deliver suitable power to the other components (for instance, the display 102 or the user input buttons 104) of the device 100.

Both conditions are illustrated in FIGS. 1A-C in which device 100N is able to perform its functions (such as displaying image 108) because, for instance, the device includes a new and in-specification battery 106N. Meanwhile device 100D is illustrated as being unable to perform its functions (such as displaying the image 108) either because the battery 106D is discharged or otherwise out-of-specification. A similar result may occur if the user uses a battery 106 of a different type than that for which the device 100 was designed to use (even if that type has similar specifications). FIG. 1B illustrates one particular result caused by an out-of-specification battery 106D by way of static 110 on display 102.

Moreover, manufacturers of many types of devices 100 seek to offer devices 100 that are compatible with a wide range of battery 106 types, technologies, models, etc. Battery technology also continues to evolve and batteries of various types continue to appear in, and disappear from, the market place. The results of these changes, as well as others, is that many device manufacturers try to design their devices 100 to accommodate a wide range of battery characteristics and, more particularly, a wide range of battery voltages. Accordingly, these manufacturers seek power supplies that deliver power at a consistent and reliable voltage despite variations in the input voltage from the various batteries 106 with which the devices 100 might be used. Often, these power supplies use switching topologies in which the switches are arranged in the form of an H-bridge with an inductor placed between the 2 half-bridges of the H-bridge and a capacitor across the output. The switches are used to store energy in the inductor and to release that energy to the output capacitor for delivery to the load, which the device 100 represents.

Figure 2:
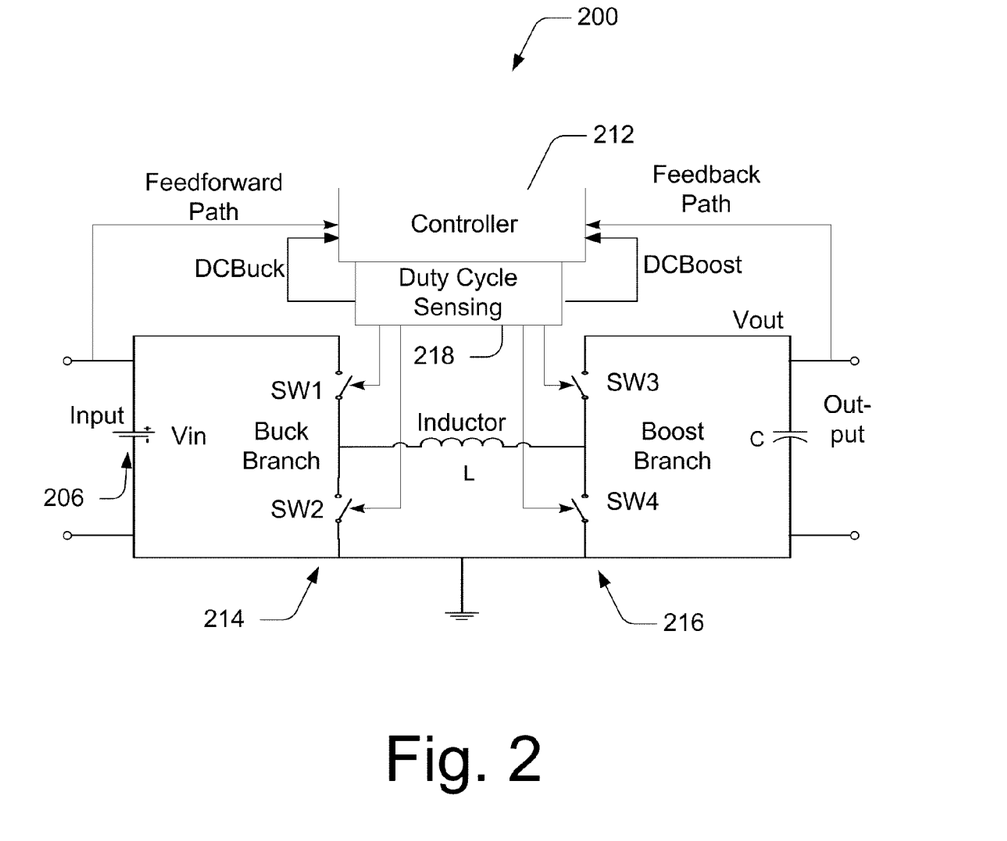
FIG. 2 is a schematic diagram of a switching converter of a battery powered device according to certain embodiments.

FIG. 2 is a schematic diagram of a switching converter of some embodiments. Devices 100 (of FIGS. 1A-C) often include a DC (direct current) to DC switching converter 200 to condition power delivered by a battery 206 (or other power supply) for delivery to the various components of the devices 100. Thus, the device manufacturers select the output voltage Vout according to the needs of the particular device 100 involved. The input voltage supplied by a particular battery 206 might therefore be either higher than or lower than the selected output voltage Vout of the particular switching converter 200 involved.

The switching converter 200 includes a controller 212, a buck branch 214, and a boost branch 216, the latter of which correspond to the two half-bridges of the previously discussed H-bridge. Generally, the controller 212, which may include a feed forward path in addition to a feedback path, manipulates the switches SW1-4 in such a manner that the buck branch 214 tends to decrease the output voltage Vout of the switching converter 200 with respect to the output voltage of the main energy provider (such as a battery 206). In contrast, operation of the boost branch 216 tends to increase the output voltage Vout. By using the buck branch 214 and the boost branch 216 in conjunction with each other, the controller 212 maintains a consistent and reliable output voltage Vout at the selected level despite variations in the input voltage Vin delivered by the particular battery 206.

Thus, according to whether the input voltage Vin is higher than or lower than the selected output voltage Vout, the controller 212 varies the duty cycles of the switches SW1-4 (and hence the buck branch 214 and the boost branch 216). More particularly, the controller 212 operates the switches SW1-4 so that, by way of illustration, 1) when switches SW1 and SW4 are closed, or SW1 and SW3 are closed and Vout is smaller than Vin, the magnetic flux in the inductor L builds up and it is also delivered to the output in the second case, or 2) when SW2 and SW3 (or SW1 and SW3) are closed, power is delivered to the output capacitor C and hence the output. Moreover, in many applications, the controller 212 uses a Pulse Width Modulation (PWM) scheme with a fixed mode (buck/boost) changing frequency to control the changes between having switches SW1 and SW4 (or SW3) and having switches SW2 and SW3 (or SW1 and SW3) closed. That fixed mode changing frequency may be chosen so that it lies in the spectrum sufficiently distant from those frequencies which might affect noise sensitive circuits (i.e., some loads) connected to the output of the switching converter 200.

With continuing reference to FIG. 2, H-bridge converters suffer from at least two sources of loss or inefficiency. One arises from resistive components in the switching converter 200 which are difficult to minimize further than the art already has. The other source of loss arises from the frequent switching activity of the switches SW1-4 which causes both so called switching losses (occurring when a condition of high voltage and high current across the switch element is present during the switching phase) and capacitive losses (due to the charged and discharged parasitic capacitance associated with the switching devices). However, in accordance with the current disclosure, it is possible to operate the switches SW1-4 in various manners to minimize those losses by limiting the total switching activity in a suitable manner, so that not all of the 4 switches are operated during a single power conversion cycle.

For instance, the controller 212 may, while the buck branch 214 is working (SW1 and SW2 are switching), keep SW4 open and may keep switch SW3 closed. In addition, while the boost branch 216 is working (switches SW 3 and SW4 are switching), the controller can keep switch SW1 closed and SW2 open. In this manner it is possible to either convert higher input voltages Vin into lower ones (buck mode) or lower input voltages Vin into higher ones (boost mode). The controller 212 may reserve the complete 4-switch operation (buck-boost mode with either switches SW1-2 closed/SW3-4 open or vice versa) for situations in which the input voltage Vin is within a suitable range of the desired output voltage Vout. That suitable range is defined by being a range in which the duty cycles for the buck and boost modes would be too close to their maximums or their minimums to provide satisfactory output voltage Vout regulation. In other words, if the difference between the input voltage Vin and the selected output voltage Vout is relatively small, the controller 212 may revert to 4-switch operation to regulate the output voltage Vout in a satisfactory manner. As a result, at least during those times when the controller 212 uses either buck or boost mode (when the input voltage Vin is sufficiently far from the selected output voltage Vout), and hence only 2 switches are operated, the switching converter 200 enjoys improved efficiency as a result of reducing switching losses.

However, by operating in the foregoing manner (or in other similar operating modes), the controller 212 would have to impose relatively large changes in the duty cycles of the buck branch 214 and the boost branch 216 every time it switched between buck and boost modes. These relatively large step-changes in the buck and boost duty cycles might pose dynamic regulation challenges for the controller 212. This result might arise because the time constant of the overall system (the switching converter 200 and its load) could lead to relatively large output voltage Vout deviations from the selected output voltage. Various embodiments disclosed herein provide strategies, systems, methods, and techniques for controlling switching converters 200 to minimize switching losses while also providing satisfactory transient response characteristics.

More particularly, embodiments disclosed herein provide methods of controlling switching converters 200 according to the magnitude of the input voltage Vin. Some of these methods accomplish the switching by checking the input voltage directly while other methods accomplish it by checking the input voltage Vin indirectly. For instance, the input voltage Vin may be checked indirectly by monitoring the duty cycles of the buck branch 214 and/or the boost branch 216 to determine if one or the other duty cycle is approaching a selected threshold. That is, while the duty cycles of the buck branch 214 and the boost branch 216 might be understood as outputs of the controller 212, one aspect of various embodiments is that the controller 212 uses its own outputs (the buck mode and boost mode duty cycles)

as inputs to determine whether to change between buck mode and boost mode. One advantage of doing so is that the controller 212 may determine whether it is or is becoming saturated independently of monitoring the input voltage directly.

Additionally, some embodiments provide methods of, and apparatus for, changing between buck mode and boost mode control (or vice versa) in a "bumpless" manner. In such bumpless transitions the output voltage Vout experiences no significant deviations from its selected value. Many of these methods may be used with different power conversion topologies, switching arrangements, etc. Moreover, the changing between buck mode and boost mode control may be accomplished at various frequencies that are below the switching frequency(s) associated with the individual switches SW1-4 or combinations thereof.

With continuing reference to FIG. 2, Equations 1 and 2 define the duty cycles of the buck branch 214 and the boost branch 216 for a theoretical or lossless switching converter 200 that operates in a continuous conduction mode.

$$\text{Buck Duty Cycle} = V\text{out}/V\text{in} \quad \text{Equation 1:}$$

$$\text{Boost Duty Cycle} = (V\text{out} - V\text{in})/V\text{in} \quad \text{Equation 2:}$$

Accordingly, as variations in the input voltage Vin (and/or the output voltage Vout) cause the input voltage to decrease toward the output voltage, the controller causes the buck duty cycle to approach 100%. Meanwhile, should such variations cause the input voltage Vin to increase toward the output voltage, the controller will cause the boost duty cycle to approach 0%. Thus, in some embodiments, as the input voltage falls (such as when the battery 206 begins to discharge) the controller 212 decreases the buck duty cycle and increases the boost duty cycle.

When the buck duty cycle about equals or exceeds 100% (switch SW1 is almost always closed), the controller 212 begins controlling in boost mode with a relatively short (near 0%) boost duty cycle. Conversely, if the boost duty cycle approaches 0%, the controller 212 begins controlling in buck mode with a relatively high buck duty cycle 100%. Generally, as the input voltage Vin decreases through the selected output voltage Vout, the controller 212 transitions from high buck duty cycles to small boost duty cycles. The converse is also true. Generally as the input voltage Vin increases through the selected output voltage Vout, the controller 212 transitions from small boost duty cycles to high buck duty cycles. Moreover, as disclosed herein, the controller 212 accomplishes these transitions seamlessly with little or no deviation of the output voltage Vout from the selected output voltage level.

While the foregoing discussion assumed that the switching converter 212 was lossless, similar considerations apply to systems which include resistive (as well as other) losses and/or loads. To accommodate switching converters 200 which happen to include losses, the controller 212 may drive a boost duty cycle greater than that required to operate a lossless switching converter 200. Thus, in situations in which the controller 212 transitions from buck to boost mode (such as when the input voltage decreases toward the output voltage), the controller 212 may drive the switches SW1-4 in such a manner that the boost duty cycle is greater than 0% even when the buck duty cycle would be about equal to 100% or perhaps even less than 100%. For instance, the controller 212 could cause a boost duty cycle corresponding to the ideal boost duty cycle but including a positive offset or bias which depends on, or is selected to boost, the output voltage Vout to accommodate the voltage drop caused by the losses and/or loads.

With continuing reference to FIG. 2, the controller 200 of some embodiments includes a duty cycle sensing portion 218. The duty sensing portion 218 can monitor the switching of various combinations of the switches SW1-4 to determine when the controller 212 is switching those various combinations of switches SW1-4 and from that information infer whether the controller 212 is operating in buck or boost mode (or even buck-boost mode). Moreover, the duty cycle sensing portion 218 can determine when, within a buck mode control cycle or a boost mode control cycle, the portion of the control cycle during which the controller 212 is holding the switches of the respective branches 214 and 216 in a static state and the complementary portion of the control cycle during which the controller is switching one (or more) of the switches between states. For instance, the duty cycle sensing portion 218 could monitor the states of the switches SW1-4 or could monitor the operation of the remainder of the controller 212 to determine this information. The monitored portions $dc_{buck}$ and $dc_{boost}$ of the control cycles are fed back to the remainder of the controller and used to control the switching converter 200 and are disclosed further with reference to FIG. 3.

Figure 3:
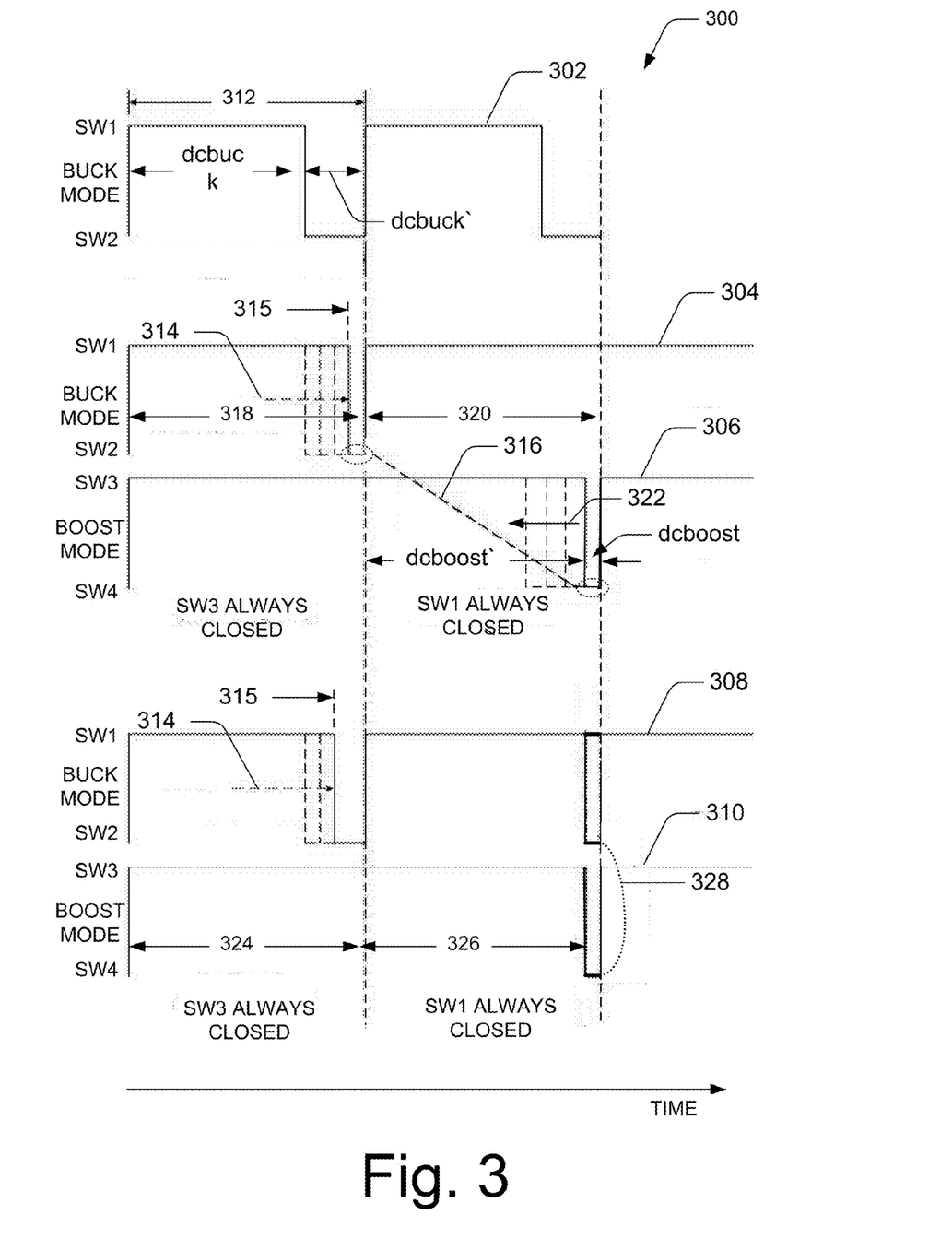
FIG. 3 is a timing diagram associated with a switching converter according to certain embodiments.

FIG. 3 is a timing diagram associated with a switching converter according to certain embodiments. Generally, FIG. 3 illustrates several switch-state-plots 302, 304, 306, 308, and 310 each of which depicts control actions taken by the controller 212 while various conditions exist which affect the switching converter 200 of FIG. 2. For instance, switch-state-plot 302 illustrates a typical control action taken with respect to the buck branch 214 high side switch SW1 and the buck branch 214 low side switch SW2. In most circumstances, when switch-state-plot 302 is high, the controller 212 maintains buck branch 214 high side switch SW1 in its closed position and maintains buck branch 214 low side switch SW2 in its open state. When switch-state-plot 302 is low the controller 212 maintains these switches in their respective opposite states. Switch-state-plots 304 and 308 use a similar convention with respect to these switches SW1 and SW2. Additionally, switch-state-plots 306 and 310 employ a similar convention with respect to boost branch 216 switches SW3 and SW4. Thus, switch-state-plots 304 and 308 illustrate that the controller 212 maintains the boost branch 216 switches SW3 and SW4 in their respective closed and open states when these switch-state-plots 304 and 308 are high. When switch-state-plots 304 and 308 are low, then controller 212 maintains boost branch 216 switches SW3 and SW4 in their respective opposite states. As alluded to in the foregoing discussion, certain exceptions exist to the complementary operation of buck branch 214 switches SW1 and SW2 (and for that matter, boost branch 216 switches SW3 and SW4) as are disclosed further herein.

With further reference to switch-state-plot 302 of FIG. 3, switch-state-plot 302 illustrates that, during a typical buck mode control cycle 312, the controller 212 drives buck branch 214 high side switch SW1 closed during a certain portion $dc_{buck}$ of the control cycle 312. This portion $dc_{buck}$ of the buck control cycle 312 is hereinafter referred as the buck duty cycle $dc_{buck}$ since it reflects the duty cycle of the buck branch 214 high side switch SW1. During the complementary portion $dc_{buck}'$ of the buck control cycle 312, the controller 212 drives the buck branch 214 low side switch SW2 closed.

Accordingly, as the duty cycle $dc_{buck}$ increases (Vin decreasing toward Vout), the portion $dc_{buck}'$ (during which the buck branch 214 low side switch SW2 is closed)

decreases and vice versa. In accordance with the current embodiment, the operation of boost branch 216 switches SW3 and SW4 (while the controller 212 operates in boost mode and Vin is increasing toward Vout) is similar to that of buck branch switches SW1 and SW2 (while the controller 212 operates in buck mode).

Switch-state-plot 304 of FIG. 3 illustrates additional aspects of the operation of the switching converter 200 of the current embodiment. More particularly, arrow 314 illustrates that as conditions affecting the switching converter 200 vary, so does the buck duty cycle $dc_{buck}$. In the particular case illustrated by arrow 314, the controller 212 responds to some condition by increasing the buck duty cycle $dc_{buck}$. Once more, the controller 212 can operate in a similar manner with respect to the boost branch 216 switches SW3 and SW4 while operating in boost mode.

Now, at some time, conditions might come to exist which cause the controller 212 to change between operating in buck mode and operating in boost mode. Typically, this occurs when the battery 206 (see FIG. 2) discharges to a point at which its supply voltage (the input voltage Vin of the switching converter 200) drops to about the same value as the selected output voltage Vout of the switching converter 200. Many other such conditions, however, exist and therefore the foregoing condition does not limit the scope of the disclosure. In any case, the controller 212 determines that these conditions make a change from buck mode control to boost mode control desirable.

Many of these conditions can be sensed directly by (for instance) comparing the input voltage Vin with the selected output voltage or by comparing the actual output voltage Vout with the selected output voltage. Both cases represent direct voltage-to-voltage comparisons and the controller 212 can accomplish either such direct control strategy. It might also be worth noting that the former case represents a form of feed forward control whereas the latter case represents a case of feedback control.

In addition, or in the alternative, the controller 212 can implement one (or more) of many indirect control strategies. For instance, the controller 212 may monitor the buck duty cycle $dc_{buck}$. When the buck duty cycle $dc_{buck}$ increases to some selected threshold 315, the controller 212 (regardless of the value of the input voltage Vin and/or the output voltage Vout) may switch from buck mode control to boost mode control. Indeed, the threshold 315 may be selected to be at some level indicating that some condition is saturating the controller 212 as it operates in buck mode. Interestingly, by monitoring the buck duty cycle $dc_{buck}$, the controller 212 can detect the onset of its own saturation (as indicated by the buck duty cycle $dc_{buck}$ approaching 100% or some other selected threshold 315). Such incipient saturation conditions can be used by the controller 212 to change control modes independently of the input voltage Vin, the output voltage Vout, and any other such direct indications.

Thus the controller 212 may, when the buck duty cycle $dc_{buck}$ so indicates, change to boost mode control from buck mode control. In addition, or in the alternative, the controller 212 could use the complementary portion dc' of the buck control cycle 312 as an indication of when to change between control modes. In such situations the complementary portion $dc_{buck}'$ would be decreasing toward some threshold (perhaps near 0%). Moreover, when operating in boost mode, the controller 212 may use similar indications of the boost duty cycle $dc_{boost}$ (and/or the complementary portion $dc_{boost}'$ of the boost control cycle) to determine when to change between control modes.

Regardless of which indication the controller 212 uses to determine that a change of control modes may be desirable, FIG. 3 illustrates a manner in which the controller 212 may change from buck mode to boost mode. More particularly, switch-state-plots 304 and 306 illustrate a change from buck mode to boost mode between control cycles 318 and 320. During the buck duty cycle $dc_{buck}$ of the first control cycle 318 (the control cycle before the control mode change), the controller 212 is operating in buck mode with the buck branch 214 high side switch SW1 closed, the buck branch 214 low side switch SW2 open, the boost branch 216 high side switch SW3 closed, and the boost branch 216 low side switch SW4 open. These switch states are illustrated by switch-state-plots 304 and 306. However, because of changing conditions in the switching converter 200, the controller 212 is holding the buck branch 214 high side switch SW1 closed for increasingly long periods of time. Eventually, the controller 212 holds the buck branch 214 high side switch SW1 open until the threshold 315 is reached.

Indeed, these same conditions may have made it such that buck mode control may no longer satisfactorily maintain the output voltage Vout at the selected level. Thus, in a particular control cycle 320, the controller 212 determines that the threshold 315 has been reached and, accordingly, keeps the buck branch 214 high side switch SW1 closed and the buck branch 214 low side switch SW2 open in that particular cycle. Thus, there is a short pulse (the complementary portion $dc_{buck}'$ of the buck control cycle 318) during which the controller 212 holds the buck branch 214 high side switch SW1 still closed while the same pulse $dc_{buck}'$ closes the switch SW4 instead of SW2, which is kept open. In this way a short boost cycle is accomplished after the mode change.

As noted elsewhere herein, the controller 212 uses that short pulse $dc_{buck}'$ as a first approximation of the amount of time during which it will hold the boost branch 216 high side switch SW3 open (and the boost branch 216 low side switch SW4 closed) to control the output voltage Vout during the first control cycle 320 of boost mode control. Illustrative line 316 indicates this relationship between the complementary portion $dc_{buck}'$ of the buck mode control cycle 318 which practically turned into the boost duty cycle $dc_{boost}$ portion of the boost mode control cycle 320.

During control cycles after the first boost mode control cycle 320, the controller 212 typically continues operating in boost mode as conditions in the switching converter 212 remain relatively steady or, in many cases, continue evolving. Indeed, if the battery 206 (see FIG. 2) continues to discharge, it is likely that the controller 212 will determine that the boost branch 216 high side switch SW3 should be held open for increasingly long boost duty cycles $dc_{boost}$ of these subsequent boost mode control cycles. Accordingly, arrow 322 illustrates the increase in the boost duty cycle $dc_{boost}$ of these subsequent boost mode control cycles. Thus, switch-state-plots 304 and 306 illustrate that the controller 212 has executed a control mode change from buck mode to boost mode between control cycles 318 and 320.

Furthermore, the controller 212 did so without causing large step changes in the buck or boost duty cycles $dc_{buck}$ or $dc_{boost}$. That is, buck branch 214 high side switch SW1 was held closed for most of the buck control cycle 318 and for all of the boost control cycle 320. Similarly, boost branch 216 high side switch SW3 was held closed for all of the buck control cycle 318 and for most of the boost control cycle 320. Moreover, the controller 212 can implement a control mode change from boost mode to buck mode in a similar fashion.

The switch-state-plots 308 and 310 of timing diagram 300 illustrate another possible method of executing a control mode change without large switch-based duty cycle changes (and the corresponding possibility of significant output voltage Vout deviations). More particularly, switch-state-plots 308 and 310 illustrate that during control cycles 324 and 326 the controller 212 executes a control mode change from buck mode to boost mode. The initial conditions, during the buck mode control cycle 324 and the complementary portion $dc_{boost}'$ of the boost mode control cycle 326 are similar to the conditions during the buck mode control cycle 318 and the boost duty cycle $dc_{boost}$ portion of the boost mode control cycle 320 as discussed previously.

One difference between the control mode change between control cycles 324 and 326 and the control mode change between control cycles 318 and 320 is that the transition from one mode to another and the related turning of $dc_{buck}'$ into $dc_{boost}$ (or $dc_{boost}'$ into $dc_{buck}$) could be eventually delayed by a certain number of cycles (for instance one cycle in FIG. 308).

Moreover, because the complementary portion $dc_{buck}'$ of the last buck mode control cycle 324 (before the control mode change) approximates the boost duty cycle $dc_{boost}$ portion of the first boost mode control cycle 326 (after the control mode change), the controller 212 may use that complementary portion $dc_{buck}'$ of the last buck mode control cycle 324 as a signal to drive the boost mode switches SW3 and SW4 as indicated by illustrative line 328. Thus, a duty cycle (of the buck branch 214 high side switch SW1) associated with the buck branch 214 may be used to determine when to execute a change between control modes and may be used to drive the boost branch 216 switches SW3 and/or SW4 (at least during times near control mode changes). Once again, similar methods may be used to switch from boost mode to buck mode control. In addition, the foregoing methods of changing control modes of the switching converter 200 minimize the switching losses associated with the operation of the switching converter 200 while also minimizing variations in the output voltage Vout.

In some embodiments, the controller 212 also determines whether conditions affecting the operation of the switching converter 200 have changed between the adjacent control cycles 324 and 326 (or 318 and 320) during which a control mode change was executed. To do so, the controller 212 determines whether the mode change threshold 315 has been crossed again. In other words, the controller 212 compares the buck duty cycle $dc_{buck}$ of the control cycle 324 (immediately preceding the control mode change) and the boost duty cycle $dc_{boost}$ of the control cycle 326 (immediately following the control mode change) with their related mode change thresholds 315 to determine whether those portions of the control cycles 324 and 326 indicate that conditions affecting the switching converter 200 changed. In some embodiments, the controller 212 checks the boost duty cycle $dc_{boost}$ in one or more additional boost control cycles following the control mode change. Such changes in the duty cycles can occur, for instance, when feedback from the output voltage Vout causes the controller 212 to alter the duty cycles of the boost branch 216 switches SW3 and SW4 following the control mode change.

When the sensed change in the boost duty cycle $dc_{boost}$ indicate that the controller 212 should change back to the previous control mode (i.e., the control mode that was executed in the previous control cycle 324), then it is likely that the controller 212 may change back to that previous control mode without creating a noticeable deviation in the output voltage Vout. This result is more likely to occur if the switching frequency associated with switching the switches SW1-4 is much higher than the time constant of the system. Since this condition usually prevails, this scenario is usually benign and, if not, then quite temporary in nature (i.e., it might happen once with the output capacitor smoothing the output and then it does not repeat).

Should the change in the duration of the boost duty cycle $dc_{boost}$ instead further militate in favor of the control mode change which occurred between control cycles 324 and 326 (or 318 and 320), then the controller 212 may continue operating in that control mode. This result is so because such a change in conditions reinforces the case for continuing to operate in the new control mode and thus militates doing so in the direction that has already been accomplished. Thus, the controller 212 is already taking the appropriate action (i.e., changing control modes) anyway.

However, conditions may arise in the switching converter 200 in which the controller 212 determines that changing between control modes is repeatedly indicated. In other words, the controller 212 may be hunting for an appropriate control mode to use for the conditions which appear to it from instant-to-instant. For instance, the input voltage Vin might be wavering across the value that the controller 212 uses to determine whether to use buck mode or boost mode control. In the alternative, or in addition, the output voltage Vout or the load on the switching converter 200 could be varying in some similar manner. To prevent such repetitious switching which can start so called limit cycles, the controller 212 may implement either a hysteresis for the mode change thresholds 315, or a time delay between changing control modes, or both. The hysteresis may decrease the sensitivity to noise and small variations and the time delay may operate to allow conditions within the switching converter 200 to stabilize or at least to eliminate a portion of the control mode changes that might otherwise occur.

The controller 212 may also accommodate other situations by offering at the same time a solution for frequent cycle to cycle mode changes. For instance, some loads with which the switching converter 200 might be used may be sensitive to the frequency at which the controller 212 changes between control modes. This sensitivity might occur because a certain amount of energy is associated with the control mode changing frequency. If not filtered, this energy is present in the power output by the switching converter 200 often with so called limit cycles. If a particular load is sensitive to the control mode changing frequency (limit cycle frequency), the energy associated therewith could affect that particular load. Accordingly, in some embodiments, the thresholds associated with the determination of whether to change control modes is randomized (or dithered). Thus, the threshold 315 may be made to dither by some small amount between control cycles 312. The dithering has the effect of delaying the control mode change in some control cycles 312 and accelerating the control mode change in other control cycles 312.

Accordingly, the changes between the control modes are randomized and the energy associated therewith (energy associated to the limit cycle) is spread out across a portion of the spectrum. By spreading out the energy, the controller 212 avoids then getting locked into a limit cycle (for instance, repetitiously finding itself in m control cycles 312 in one mode and then in n control cycles in the other mode). Instead, the randomization of the threshold eliminates any limit cycle that might attempt to develop within the controller 212.

In addition, the randomization of the threshold 315 spreads out the energy associated with changing control modes and that would otherwise appear in the output power (at the frequency at which the controller 212 changes control modes). Instead, that energy appears as random noise at a level sufficiently low so as to not affect loads connected to the output even if they are sensitive to the control mode changing frequency. Moreover, the randomization of the thresholds may use "noise shaping" (for instance, sigma-delta modulation) techniques to further define the form in which that energy appears in the output power. For instance, in accordance with some noise shaping techniques, the dithering (or other alterations) to the thresholds can be chosen to partially or totally remove the energy associated with changing control modes from frequency bands which might affect loads connected to the output of the switching converter 200. Randomizing the thresholds may also prevent or suppress oscillations of the output voltage Vout at, near, or related to the frequency with which the controller 212 changes control frequencies.

In some embodiments, if a nominal transition between buck mode control and boost mode control occurs at a buck branch 214 high side switch SW1 duty dcbuck of 95% or greater, this threshold may be "dithered" from cycle to cycle. For instance, the threshold could be made to randomly vary between 92% and 98% to provide an average threshold of 95%. Likewise, a threshold of 5% for the boost branch 216 duty cycle $dc_{boost}$ could be randomly selected from between 2% and 8%. Of course, the particular thresholds and the particular degrees of randomization presented here are merely illustrative and non-limiting.

Figure 4:
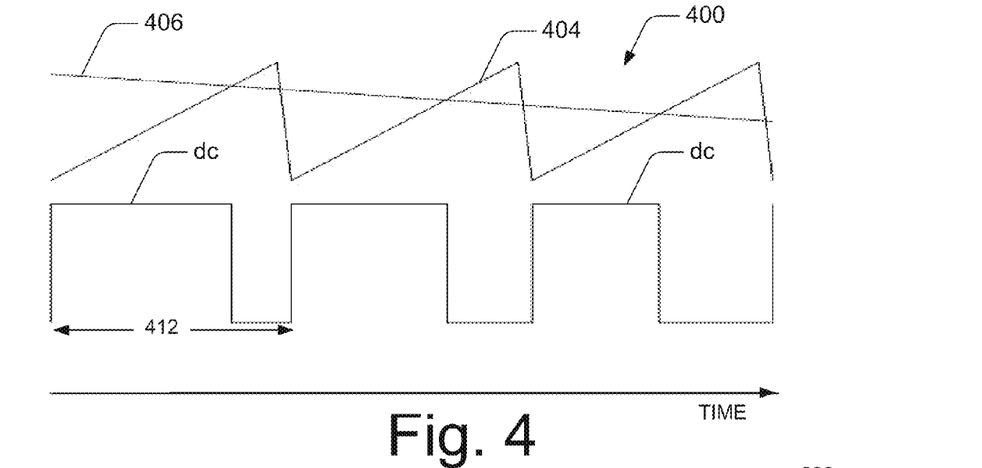
FIG. 4 is another timing diagram associated with a switching converter according to certain embodiments.
Figure 5:
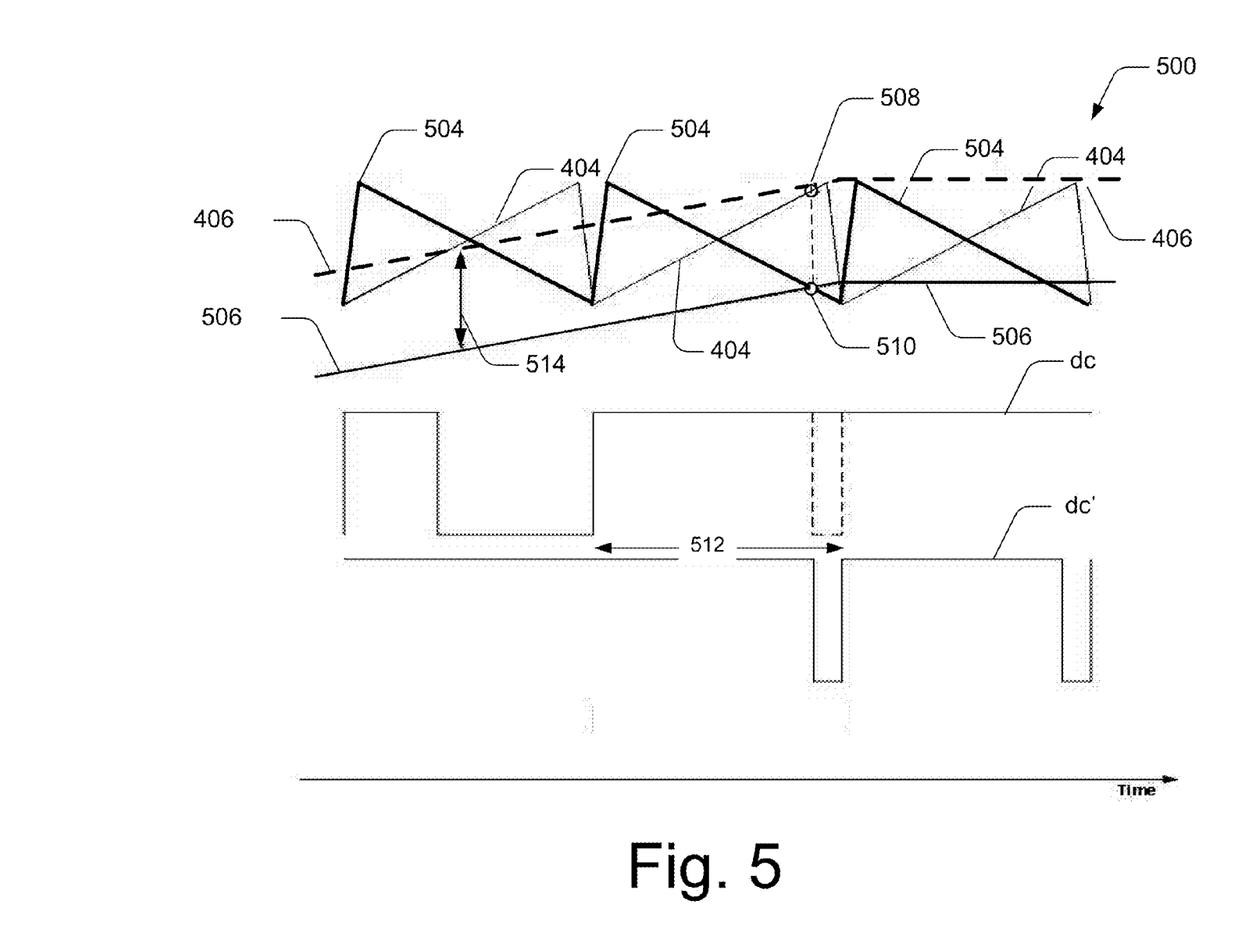
FIG. 5 is a timing diagram associated with another switching converter according to certain embodiments.
Figure 6:
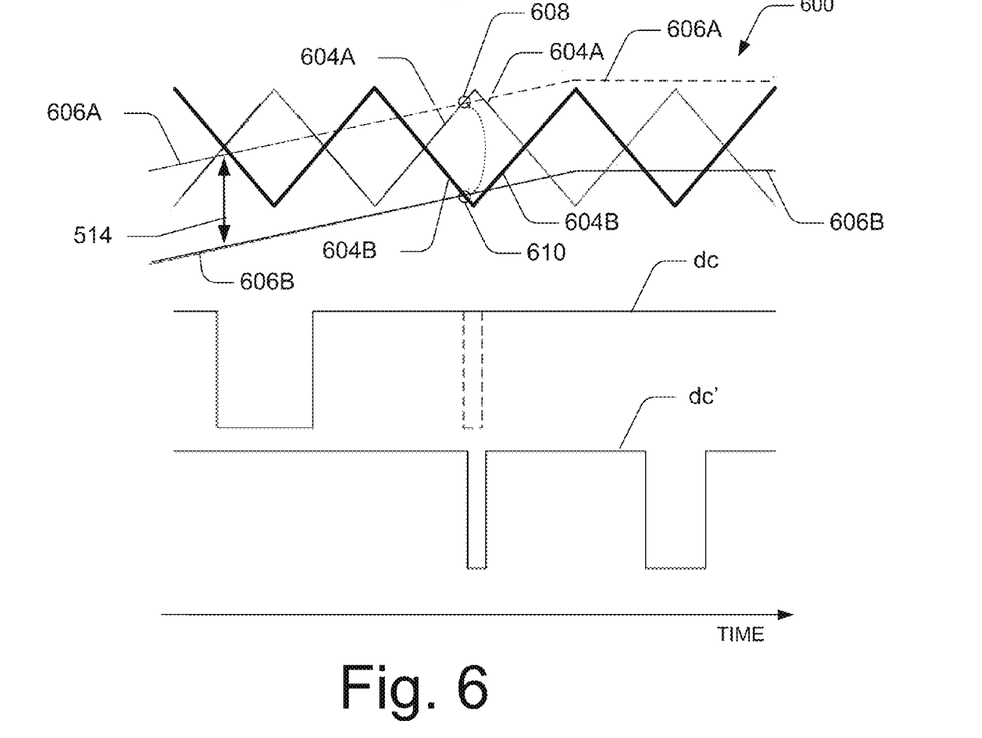
FIG. 6 is yet another timing diagram associated with another switching converter according to certain embodiments.
Figure 7:
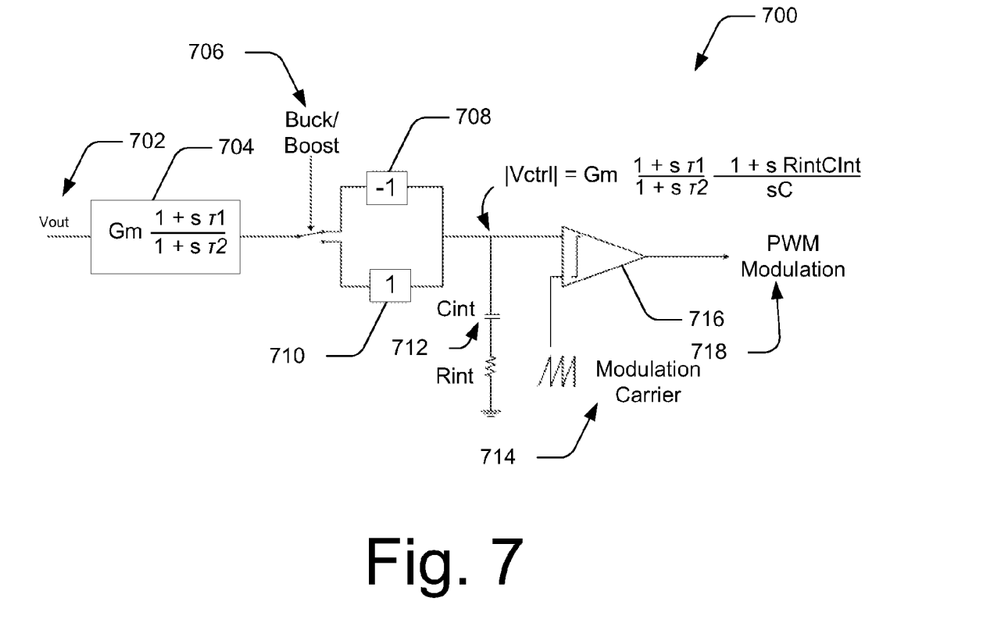
FIG. 7 is a schematic diagram of a controller for a switching converter according to certain embodiments.
Figure 8:
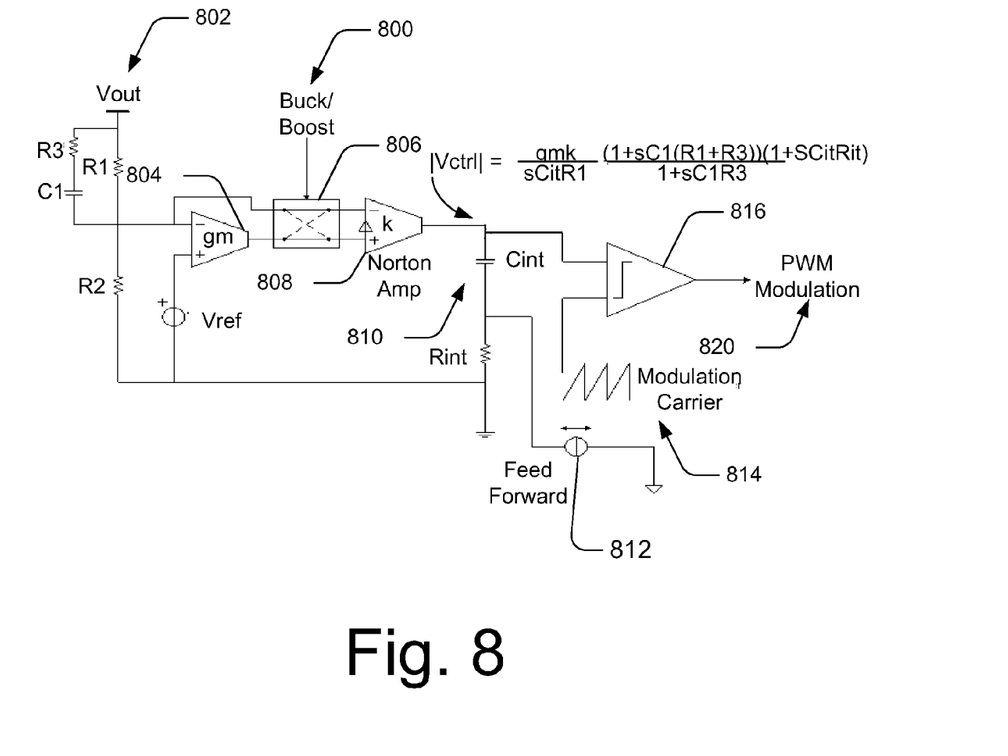
FIG. 8 is another schematic diagram of a controller for a switching converter according to certain embodiments.

With continuing reference to FIG. 3, the determination of the buck duty cycle $dc_{buck}$, the boost duty cycle $dc_{boost}$, and whether to switch between control modes may be implemented in relatively simple logic. That is to say that the controller 200 may include logic (software, hardware, firmware, or a combination thereof) which detects when the controller 212 itself is driving the switching converter 200 in buck mode or boost mode; calculating the duty cycles thereof; and inverting the signal(s) corresponding to the buck duty cycle $dc_{buck}$ and/or the boost duty cycle $dc_{boost}$. FIGS. 4-6 illustrate some aspects of such logic while FIGS. 7-8 illustrate hardware-based analog implementations of such logic. Moreover, signals indicative of the buck (and boost) duty cycles $dc_{buck}$ (and $dc_{boost}$) may be directed to the correct branch (the buck branch 214 or the boost branch 216) of the switching converter 200 with appropriate multiplexers or other logic. Furthermore, while the foregoing disclosure has related to a change from buck mode to boost mode, a switch from boost mode to buck mode follows similar reasoning as that disclosed herein.

FIG. 4 is another timing diagram associated with a switching converter of some embodiments. The timing diagram 400 illustrates the operation of a switching converter 200 (controlled in a pulse width modulation scheme) which compares a periodic carrier signal 404 with a feedback signal 406 that depends on or is derived from the output voltage Vout (i.e., a signal feeding the output voltage Vout back to the controller 212). The gain applied to the feedback signal 406 and the parameters (i.e., the ramp rate and amplitude) of the saw tooth carrier signal 404 are selected so that when the feedback signal 406 crosses the carrier signal, the buck duty cycle $dc_{buck}$ ends and the complementary portion $dc_{buck}'$ of the control cycle 412 begins as illustrated by timing diagram 400. When the saw tooth carrier 404 returns to zero at the end of a control cycle 412, another buck duty cycle $dc_{buck}$ begins. In some embodiments, the controller 212 generates the periodic carrier signal 404 and/or the feedback signal 406 using analog circuitry while in other embodiments the controller determines these signals 404 and/or 406 numerically via digital circuitry (such as a processor).

FIG. 4 also illustrates a situation in which the output voltage Vout is increasing and a gain (and a sign) is applied to the feedback signal 406 so that as the output voltage Vout increases, the feedback signal 406 decreases (negative feedback). As a result, the point in the control cycle 412 at which the feedback signal 406 crosses the carrier signal 404 occurs earlier with each successive control cycle 412. Thus, the buck duty cycle $dc_{buck}$ shortens as a result and the output voltage Vout decreases toward the selected output voltage and it's kept in regulation. In this manner, as the output voltage Vout decreases in response to the control action, the feedback signal 406 increases causing the buck duty cycle dc to increase. In turn, the output voltage Vout increases back toward the selected output voltage. Thus, the control scheme illustrated by the timing diagram 400 of FIG. 4 implements voltage mode regulation of the output voltage Vout. As is discussed with more specificity herein, a similar timing diagram and associated circuitry could also be implemented with respect to control the boost duty cycle $dc_{boost}$.

However, the buck control mode and the boost control mode would operate in opposite directions to control the output voltage Vout, if the sign of the feedback loop is fixed. That is, to decrease the output voltage Vout while operating in buck mode, the buck duty cycle $dc_{buck}$ decreases according to the feedback control. Once a mode change has occurred, to decrease the output voltage while operating in boost mode, the boost duty cycle $dc_{boost}$ should also decrease. However, the feedback loop, still keeping the sign it had in buck mode, would make it actually increase. Accordingly, simply swapping the switch control signals of the buck branch 214 and the boost branch 216 might introduce a sign inversion into the controller 212 perhaps, depending on other aspects of the overall system, leading to positive feedback affects and system functional instability. Thus, in embodiments in which the signals corresponding to the buck duty cycle $dc_{buck}$ and the boost duty cycle $dc_{boost}$ are swapped and then used to drive the boost branch 216 and the buck branch 214 respectively (i.e., the buck signal is driving the boost branch 216 and vice versa), a sign inversion is introduced in the feedback loop if it is desired to prevent possible positive feedback effects leading to potential functional system instability.

A feed forward control scheme which monitors the input voltage Vin for variations could also be implemented in a manner similar to that described herein with reference to FIG. 4. For instance, the parameters of a carrier wave and the gain (and sign) applied to a feed forward signal may be chosen so that the interaction of the feed forward signal, the modulation carrier signal and the control signal could result in either negative or positive feed forward effects with or without weighting of such effects as may be desired.

FIG. 5 is another timing diagram associated with a switching converter of some embodiments. The timing diagram 500 introduces a second carrier 504 and a second feedback signal 506. These signals 504 and 506 are associated with controlling the boost branch 216 of the switching converter 200 of FIG. 2 whereas the signals 404 and 406 are associated with controlling the buck branch 214 of the switching converter 200. More particularly, the gain (and sign) applied to the boost carrier signal 504 and the boost feedback signal 506 (from the output voltage Vout) are chosen so that as the output voltage Vout decreases, the boost duty cycle $dc_{boost}$ increases thereby driving the output voltage Vout back up toward the selected output voltage.

Thus, the boost branch 216 is driven depending on when the boost feedback signal 506 crosses the boost carrier signal 504. Incidentally, in FIG. 5, the upwards slope of the feedback signals 406 and 506 indicates that the output voltage is decreasing.

The boost feedback signal 506 is generated in the current embodiment by adding (or subtracting) an offset 514 to the buck feedback signal 406. That offset 514 could be chosen to be about the same magnitude as the amplitude of the periodic carrier signals 404 and 504 (which in this embodiment are about equal to each other). Furthermore, the carriers 404 and 504 can be saw tooth or triangular waves or signals and horizontally symmetrical, and/or phase shifted 180 degrees with respect to each other (as may be desired). Thus, when the buck feedback signal 406 crosses the buck carrier signal 404 at the threshold indicating a control mode change, the boost feedback signal 506 is also very near to crossing the boost carrier signal 504. Accordingly, the interaction of the buck feedback signal 406 and the buck carrier signal 404 cause the switch SW1 to be driven closed and the interaction of the boost carrier signal 504 and the boost feedback signal 506 sets the duty cycle of switches SW3 and SW4 to control the output voltage Vout. See the illustrative circles 508 and 510 which indicate these signal interactions. In some embodiments, the circuitry and its elements associated with generating the buck carrier signal 404, the buck feedback signal 406, the boost carrier signal 504, the boost feedback signal 506, the offset 514, etc. is matched on an integrated circuit chip. In the alternative, or in addition, the offset 514 and the signals 404, 406, 504, and 506 could be adaptive depending on, for instance, loading and loss characteristics associated with the switching converter 200.

Moreover, the offset 514 may be randomized with dithering or noise shaping techniques from cycle to cycle in alternative to the thresholds that define the mode change in order to avoid the onset of limit cycles between the two modes as disclosed herein. In addition, or in the alternative, the slope of the modulation carrier (i.e. the saw tooth wave) may be randomized from cycle to cycle by randomly changing either the amplitude of the ramp with a fixed cycle duration, randomly changing the period of the carrier wave with a fixed amplitude, or combinations thereof. For embodiments which randomize the period of the carrier wave, the carrier wave can be deemed to be a quasi periodic carrier wave.

When it is desired to strictly synchronize the turn-on and turn-off of the various switches SW1-4 with the switches of other switching converters, embodiments of the switching converter 200, which use the saw tooth carrier signals 404 or 504, are often used. For instance, these switching converters 200 may be used in situations involving complex systems in which the switching converters 200 are synchronized with other switching converters. However, switching converters 200 of other embodiments may be used in such situations as well without departing from the scope of the disclosure.

FIG. 6 is yet another timing diagram associated with a switching converter of some embodiments. More particularly, the timing diagram 600 illustrates two triangular carrier signals 604A and 604B that are used to determine when to drive the buck branch 214 and when to drive the boost branch 216, respectively. The triangular carrier signals 604 of the current embodiment are generated using a fully differential integrator. In other embodiments, the triangular carrier signals 604 are generated by exchanging the outputs of a circuit generating two saw tooth signals which are phase shifted 180 degrees from each other.

Again, the interaction of the carrier signals 604A and 604B with their feedback signals 606A and 606B indicate when the buck branch 214 and the boost branch 216 are driven to control the output voltage Vout. Illustrative circles 608 and 610 indicate interactions, which cause the controller 212 to drive the buck branch 214 and the boost branch 216, respectively. If the offset 514 and the signals are matched on, for instance, an integrated circuit, then these interactions 608 and 610 will occur approximately simultaneously.

FIG. 7 is a schematic diagram of a controller 700 for a switching converter of some embodiments. The switching converter controller 700 is an analog embodiment of a controller 212 which relies on one carrier signal (either a saw tooth or triangular carrier such as carrier signals 404 or 604 respectively) and one control signal (such as buck feedback signal 406. Moreover, the controller 700 provides voltage mode regulation by using a PID (proportional-integral-derivative) control loop.

More particularly, the controller 700 includes an output voltage input 702, a pre-amplifier (or transconductor) 704, an input 706 (for receiving an indication of whether the switching converter 200 is currently in buck mode or boost mode), an inverting amplifier 708 (with a gain of one in some embodiments), a non inverting amplifier 710 (also with a gain of one in some embodiments), a capacitor 712, an input 714 (for the carrier wave signal), and a comparator 716 which drives a PWM (pulse width modulation) signal at an output 718. The components 702, 704, 706, 708, 710, 712, 714, 716, and 718 are connected as illustrated by FIG. 7.

The pre-amp (or transconductor) 704 has a transconductance gain of GM and conditions the output voltage Vout signal for further conditioning as shown. More particularly, depending on whether the signal at the buck/boost input 706 indicates that the controller 700 is operating in buck mode or boost mode, the output voltage Vout signal is inverted by the inverter 708 or simply feed to the remainder of the controller 700 via the non-inverting amplifier 710. In this way the control loop sign inversion described herein can be taken care of, by making the sign of the signal coming from the conditioning amplifier 704 mode dependent. The integrating capacitor 712 and the comparator 716 work in conjunction with each other and the carrier signal from the carrier signal input 714 to determine the PWM signal at the output 718.

The gains of the PID control loop implemented by controller 700 may be tuned to provide transient response characteristics as desired. For instance, the gain of the integral term may be tuned (according to whether it works in conjunction with the buck feedback signal 406 or the boost feedback signal 606) to provide fast transient response characteristics. Moreover, the capacitor 710 is provided to store the voltage associated with the integral term. Since the losses in the switching converter 200 should not change much during control mode changes, the integral term voltage stored on capacitor 710 remains essentially unchanged or changes very little across control mode changes thereby providing a smooth, bumpless, and seamless transition across changes between buck mode and boost mode control.

FIG. 8 is another schematic diagram of a controller for a switching converter of some embodiments. More particularly, the controller 800 includes an input 802 (for accepting the output voltage Vout signal), a pre-amplifier 804, a buck/boost mode inverter 806, post-amplifier 808, a capacitor 810, another input 812 (for accepting a signal carrying information regarding the input voltage Vin signal), yet another input 814 (for the carrier signal), and a comparator 816 which drives a PWM signal at an output 820. FIG. 8 also illustrates that the controller 800 includes a feed forward term (or input current source) which reflects the value of the input voltage Vin signal. Also, FIG. 8 illustrates that such a controller 212 may be implemented with analog components.

Figure 9:
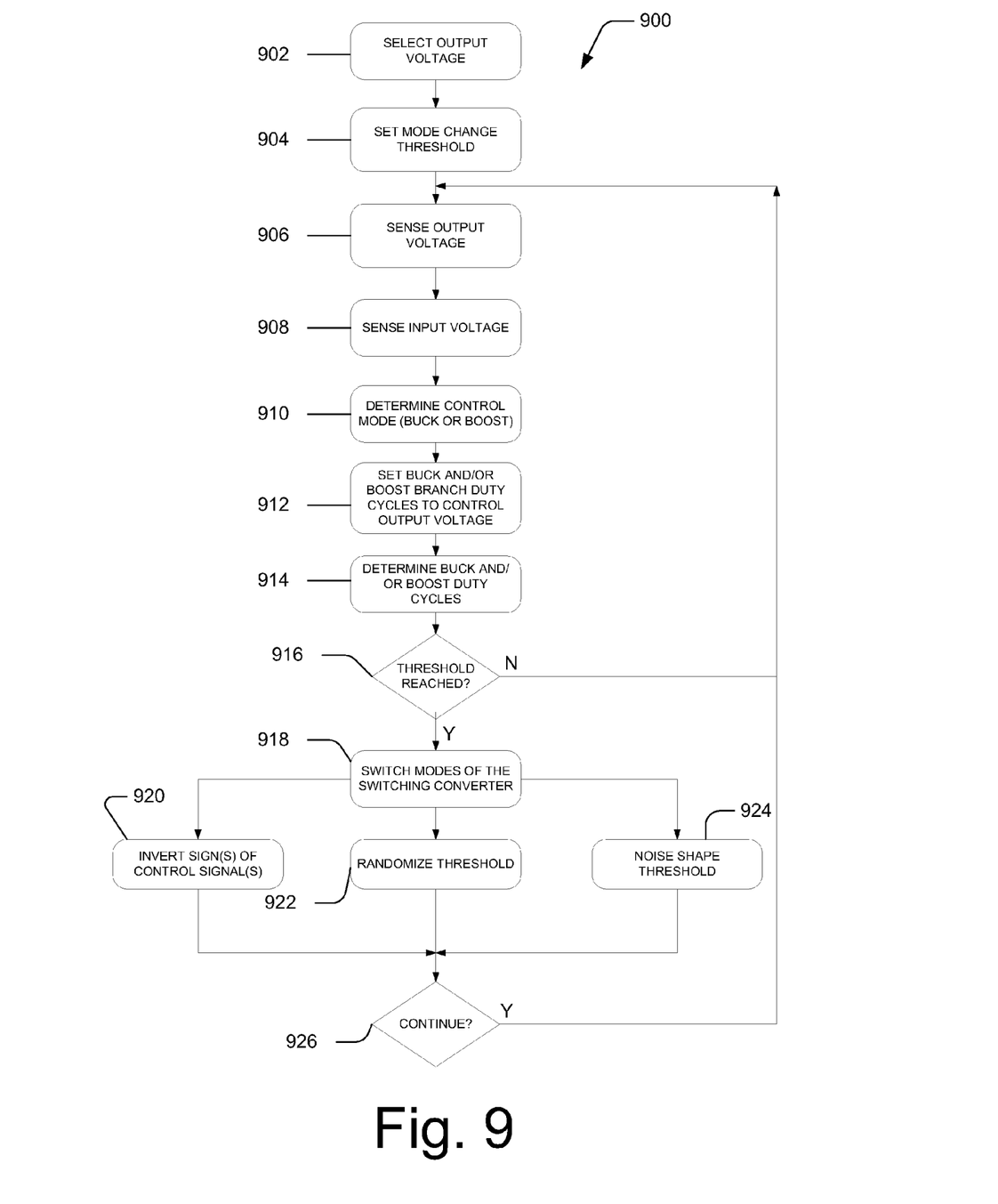
FIG. 9 illustrates a method of controlling a switching converter according to certain embodiments.

FIG. 9 illustrates a method of controlling a switching converter of some embodiments. The method 900 includes various steps such as step 902 at which the desired output voltage Vout is selected. If desired, at step 904, a threshold may also be selected so that changes between control modes may be delayed sufficiently to avoid repetitious mode changes. Steps 906 and 908 provide for sensing the output voltage Vout and the input voltage Vin of the switching converter 200 (see FIG. 2). From the sensed voltages Vout and Vin, the controller 212 determines which control mode (either buck or boost) to use in controlling the switching converter 200. See step 910. The method also includes setting the duty cycle for the buck branch 214 and/or the boost branch 216. See steps 912 and 914.

At step 914, the method includes determining the buck duty cycle dc (and/or the boost duty cycle dc') of the current control cycle. Thus, the method includes examining the status of the buck branch 214, the boost branch 216 and/or the switches SW1-4. Furthermore, based on the foregoing information, the method 900 includes determining whether it is desirable to change the control mode at step 916. If the buck duty cycle has increased beyond some threshold, then the method includes changing control modes to boost mode. If the controller 212 is already in boost mode and the buck and boost duty cycles of the current control cycle so indicate, then the method 900 includes changing the control mode to buck mode. See step 918. Also, depending on the embodiment, the control signal may be inverted to provide negative feedback for the output voltage Vout. See step 920. Additionally, the threshold used to determine whether to switch between control modes may be randomized at step 922. If desired, the randomization of the threshold can include noise shaping the threshold as illustrated at step 924. However, if conditions indicate that a control mode change is not necessarily desirable, then the process may repeat from steps 906 and 908 where the output voltage Vout and the input voltage Vin are sensed as indicated at step 926.

Specifics of exemplary methods are described herein. However, it should be understood that certain acts need not be performed in the order described, and may be modified, and/or may be omitted entirely, depending on the circumstances. Moreover, the acts described may be implemented by analog circuitry, a computer, processor or other digital device based on instructions stored on one or more computer readable storage media. The computer-readable media can be any available media that can be accessed by a computing device to implement the instructions stored thereon.

Embodiments disclosed herein provide strategies to operate a switching converter which are robust and may tolerate larger deviations in the input voltage of the switching converters than previously available strategies. More particularly, these strategies accommodate relatively large deviations in the input voltage from the desired output voltage. Many of the foregoing techniques include determining whether to switch between control modes (buck or boost modes) depending on a direct measurement of the input voltage. Many of the foregoing techniques, however, involve making the control mode switching decision based on an indirect measure of the input voltage. That is, the decision to change control modes is determined based on the duty cycle of either the buck branch or the duty cycle of the boost branch of the switching converter.

Moreover, by implementing switching arrangements (of switching converters' switches), embodiments also provide switching converters which operate more efficiently than would otherwise be the case. More particularly, embodiments provide improved dynamic regulation of the sequencing of the switching converter's switches. Additionally, or in the alternative, embodiments provide for inverting the control signals driving the switches so that the foregoing techniques provide negative feedback as desired.

As a result, embodiments provide switching converters which operate with a greater range of battery types, models, etc. Moreover, embodiments provide switching converters which operate over a wide range of input voltages provided by various power supplies (such as batteries). Thus, as these power supplies discharge (or behave as if they are discharging) the switching converters of various embodiments continue supplying power at the selected output voltage despite receiving power from power sources which might be degraded or otherwise out of specification.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the systems described could be configured as analog or digital systems without departing from the scope of the disclosure.

The invention claimed is:

1. A switching converter comprising:
    a buck branch with an associated buck duty cycle, the buck branch comprising a first plurality of switches;
    a boost branch with an associated boost duty cycle, the boost branch comprising a second plurality of switches; and
    a controller in communication with the buck branch and the boost branch and being configured to:
        monitor a respective state of each of the first plurality of switches and the second plurality of switches;
        determine, based on monitoring the respective state of each of the first plurality of switches and the second plurality of switches, the buck duty cycle or the boost duty cycle; and
        responsive to the determined duty cycle reaching a threshold duty cycle, change between a buck mode and a boost mode.

2. The switching converter of claim 1 further comprising a feedback loop from an output of the switching converter whereby an output voltage is used to adjust the operation of the controller.

3. The switching converter of claim 1 further comprising a feed-forward path from an input of the switching converter whereby an input voltage is used to adjust the operation of the controller.

4. The switching converter of claim 1 wherein the switching converter is associated with an electronic device to be powered with a battery and further comprising a load, wherein an input of the switching converter is in electrical communication with the battery and an output of the switching converter is in electrical communication with the load.

5. The switching converter of claim 1 wherein the controller is an analog controller.

6. The switching converter of claim 5 further comprising a modulation carrier wave generator with a modulation carrier wave output selected from the group consisting of a periodic modulation carrier wave output and a quasi-periodic modulation carrier wave output, the controller using the modulation carrier wave output to determine when to change between the modes.

7. The switching converter of claim 1 further comprising an inverter configured to invert a control signal associated with the buck mode, the controller being further configured to drive the boost branch with the inverted control signal.

8. A switching converter comprising:
 a buck branch with a time varying buck duty cycle, the buck branch comprising a first plurality of switches;
 a boost branch with a time varying boost duty cycle, the boost branch comprising a second plurality of switches; and
 a controller configured to:
  control the switching converter in a buck mode when an input voltage of the switching converter is about equal to or greater than an output voltage of the switching converter;
  control the switching converter in a boost mode when the input voltage is about equal to or less than the output voltage;
  monitor a respective state of each of the first plurality of switches and the second plurality of switches;
  determine, based on monitoring the respective state of each of the first plurality of switches and the second plurality of switches, the buck duty cycle or the boost duty cycle, and
  responsive to the determined duty cycle reaching a threshold duty cycle, change between controlling the switching converter in the buck mode and the boost mode to maintain the output voltage at a selected voltage.

9. The switching converter of claim 8 wherein the controller is an analog controller implemented with analog circuitry.

10. The switching converter of claim 8 wherein the controller is implemented on a processor.

11. The switching converter of claim 8 wherein the controller is further configured to randomize the threshold duty cycle associated with the determined duty cycle.

12. The switching converter of claim 8 further comprising a signal generator, the controller being further configured to use a signal generated by the signal generator to change between controlling the switching converter in the buck mode and the boost mode.

13. The switching converter of claim 12 wherein the signal generated by the signal generator is selected from the group consisting of a periodic signal and a quasi-periodic signal, and the selected signal generated by the signal generator is a carrier signal of the controller.

14. A method comprising:
 controlling, by a controller, a converter in either a buck mode or a boost mode;
 monitoring, by the controller, a respective state of each of a first plurality of switches of a buck branch of the converter;
 monitoring, by the controller, a respective state of each of a second plurality of switches of a boost branch of the controller;
 determining, by the controller and based on monitoring the respective state of the first plurality of switches and the second plurality of switches, a buck duty cycle associated with the buck branch of the converter or boost duty cycle associated with the boost branch of the converter; and
 responsive to the determined duty cycle reaching a threshold duty cycle, changing, by the controller, between the buck mode and the boost mode.

15. The method of claim 14, wherein controlling the converter in either the buck mode or the boost mode comprises controlling the converter in the buck mode, wherein changing between the buck mode and the boost mode comprises changing from the buck mode to the boost mode.

16. The method of claim 14 further comprising delaying the changing between the modes by applying a time delay to the threshold duty cycle associated with the determined duty cycle.

17. The method of claim 14 further comprising using noise shaping in conjunction with the threshold duty cycle to suppress oscillations in an output voltage of the converter.

18. The method of claim 14 further comprising delaying the changing between the modes by applying a hysteresis to the threshold duty cycle associated with the determined duty cycle.

19. The method of claim 14 further comprising randomizing the threshold duty cycle.

20. The method of claim 19 wherein the randomizing of the threshold duty cycle further comprises using a noise shaping technique.

* * * * *